May 25, 1954 A. A. MACDONALD 2,679,584

DETECTOR

Filed June 15, 1949

WITNESSES:

INVENTOR

Angus A. Macdonald

BY

ATTORNEY

Patented May 25, 1954

2,679,584

UNITED STATES PATENT OFFICE 2,679,584

DETECTOR

Angus A. Macdonald, Catonsville, Md., assignor to Westinghouse Electric Corporation, East Pittsburgh, Pa., a corporation of Pennsylvania Application June 15, 1949, Serial No. 99,243

4 Claims. (Cl. 250—27)

This invention relates to linear detectors, and it relates more particularly to circuits for providing linearity from non-linear detectors.

The detectors used most frequently in circuits where linear response is desired are crystals and vacuum tube diodes. These detectors are not, however, truly linear at small signal amplitudes. Their non-linearity is greatly increased where it is necessary to operate such detectors with load resistances which are not many times greater than the forward resistances of the detectors. Their non-linearity is caused by their increase in forward resistance as the forward voltage drop across them decreases. The back resistances of crystal detectors decrease as their forward resistances increase, so that such detectors will be non-linear at small signal amplitudes regardless of the magnitudes of the load resistances.

This invention provides linearity from a non-linear detector by loading the detector with a non-linear load having the same characteristics as the detector. Thus one non-linear rectifier element can be used as a load for a similar non-linear element used as a detector.

An object of the invention is to provide linearity from a non-linear detector.

Another object of the invention is to load a non-linear detector with a non-linear load having characteristics similar to those of the detector.

Another object of the invention is to provide for a non-linear rectifier element used as a detector, a similar element as a load.

The invention will now be described with reference to the drawing, of which:

Figure 1:
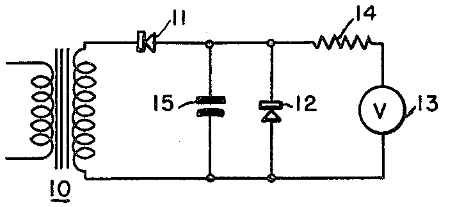
Fig. 1 is a circuit schematic illustrating the invention embodied in a voltmeter circuit which would be used where the source impedance is small compared to the detector input impedance.

Referring first to Fig. 1 of the drawing, the primary winding of the transformer 10 is connected to a source of alternating current voltages to be measured. Its secondary winding has the rectifier elements 11 and 12 connected in series thereacross, the element 11 serving as a detector, and the element 12 serving as a non-linear load for the detector. The two elements are connected, as illustrated by the drawing, to conduct in the same direction. The output circuit is terminated in the direct current voltmeter 13 which has an input resistance 14 shunted as a load resistance across the element 12.

The by-pass capacitor 15 is connected across the rectifier element 12, but its use is optional although desirable. Its only effect is to decrease the alternating current component, and to increase the direct current component, of the voltage appearing across the load element 12.

The rectifier elements 11 and 12 should be similar in that they should have the same voltage-resistance characteristics whereby the non-linearity of the element 12 corrects for the non-linearity of the element 11 so that the output voltage appearing across the load element 12 and indicated by the meter 13 will be linear. The elements 11 and 12 may be crystals, diode vacuum tubes, the electrodes of other tubes used as rectifier electrodes, or other rectifiers such as copper oxide or selenium rectifiers.

Figure 2:
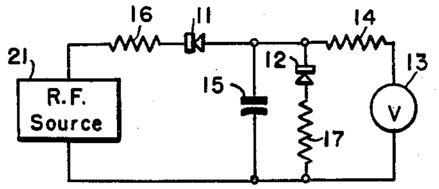
Fig. 2 is a circuit schematic illustrating the invention embodied in a voltmeter circuit which would be used where the source impedance is not small compared to the detector input impedance.

The embodiment of the invention illustrated by Fig. 1 of the drawing is suitable where the source resistance is much less than the input resistance of the detector element 11. Where the source resistance is not much less than the input resistance of the detector element as in the case of most applications, it must be compensated for as illustrated by Fig. 2 of the drawing where the source resistance is illustrated as the resistor 16 connected in series with the rectifier element 11 and the source 21. For linearity, the resistor 17 having substantially the same resistance as the resistor 16 is connected in series with the rectifier element 12, the two together forming the non-linear load for the detector 11.

In the circuits of Figs. 1 and 2 the value of the voltmeter resistance 14 should be sufficiently greater than the back resistance of the element 12 which it shunts, when the latter is a crystal, and should be sufficiently greater than the forward resistance of the element 12 when the latter is a diode tube, that it does not appreciably load the circuit.

In cases where the meter resistance 14 is such that it forms a load resistance which appreciably loads the circuit, substantially the same value of resistance should be shunted across the detector element 11 where the source resistance is much less than the input resistance of the detector element, and should be shunted across the detector element and the source resistance where the source resistance is not much less than the input resistance of the detector element.

Figure 3:
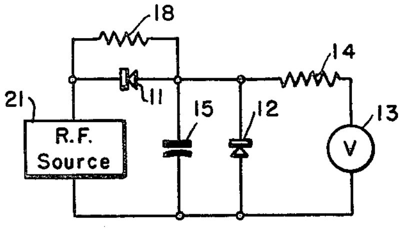
Fig. 3 is a circuit schematic of the invention embodied in a voltmeter circuit which would be used where the source impedance is small compared to the detector input impedance, and where the non-linear load is shunted by a load resistance which is not large compared to the non-linear load resistance.

Fig. 3 of the drawing illustrates a case where the resistance 14 of the voltmeter 13 is such a relatively low, shunt resistance, and where the input resistance of the source 21 is so much less than the input resistance of the detector element 11 that it can be disregarded. For linearity, the resistor 18 having about the same resistance as the resistance 14 should be shunted across the detector element 11.

Figure 4:
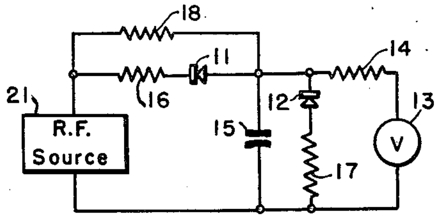
Fig. 4 is a circuit schematic of the invention embodied in a voltmeter circuit which would be used where the source impedance is not small compared to the detector input impedance, and where the non-linear load is shunted by a load resistance which is not large compared to the non-linear load resistance.

Fig. 4 of the drawing is similar to Fig. 3 thereof except that since the source resistance is not much less than the input resistance of the detector element 11, a resistor 17 having the same value is connected in series with the rectifier element 12. Since the resistance 14 is shunted across the load element 12 and the resistor 17, a corresponding resistor 18 is shunted across the detector element 11 and the resistance 16 of the source.

Figure 5:
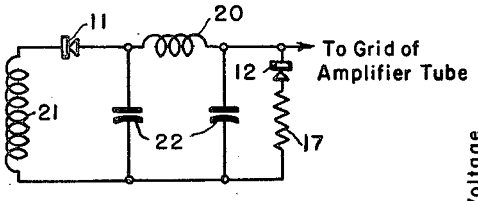
Fig. 5 is a circuit schematic illustrating another embodiment of the invention suitable for the detection of amplitude modulated signals in a radio or television receiver.

Fig. 5 of the drawing illustrates the invention embodied in a detector circuit for a radio or television receiver. The source 21 of radio frequency voltages is connected to the detector element 11 and it has a resistance equal to that of the resistor 17 connected in series with the load element 12. The radio frequency choke 20 and the bypass capacitors 22 are connected between the detector element 11 and the load element 12. The signal at the output side of the load element is connected to the grid of a following amplifier tube.

Figure 6:
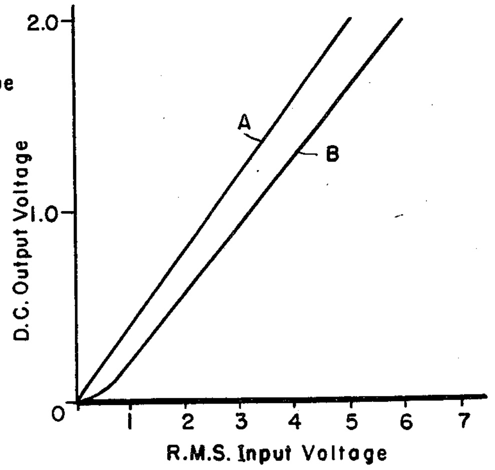
Fig. 6 is a graph illustrating the linear characteristics of a circuit embodying this invention.

Fig. 6 of the drawing illustrates the linearity provided by this invention. The input voltages are plotted against the output voltages, the line A representing the response using two 1N34 crystals picked at random, and the line B representing the response using the two diode sections of a 6AL5 dual diode tube picked at random, one diode section serving as a detector element, and the other diode section serving as the load therefor.

The mathematical proof of the linearity of the circuit of Fig. 1 without the capacitor 15 is demonstrated in the following, the source resistance being assumed to be zero so that where diodes are used for the detector and load elements, the effects of Edison currents will be balanced out.

$e$=the applied A. C. voltage
$e_1$=the A. C. voltage across the detector element
$e_2$=the A. C. voltage across the non-linear load element
$e_0$=the D. C. voltage across the non-linear load element
$i$=the A. C. current
$K_1$ and $K_2$ are constants
$\alpha$ is an exponent
$E$=the peak response of $e$
$i=K_1e_1^\delta$ and $K_2e_2^\delta$ $$\therefore e_2=\left(\frac{K_1}{K_2}\right)^{1/\alpha}e_1$$

but $$e=e_1+e_2$$

$$\therefore e_1=e-e_2$$

and $$e_2=\left(\frac{K_1}{K_2}\right)^{1/\alpha}e-\left(\frac{K_1}{K^2}\right)^{1/\alpha}e_2$$

and $$e_2=\frac{e}{\left(\frac{K_2}{K_1}\right)^{1/\alpha}+1}$$

If $e$ is a sine wave having a peak amplitude E, the D. C. voltage, $e_0$ across the load diode will be:

$$e_0=\frac{E}{\pi\left[\left(\frac{K_2}{K_1}\right)^{1/\alpha}+1\right]}$$

Regardless of the relative values of $K_1$ and $K_2$, it can be seen from the above that $e_0$ is proportional to E.

If $K_1=K_2$ then $$e_0=\frac{E}{2\pi}=0.16E$$

The mathematical proof of the linearity of the same circuit using the by-pass capacitor 15 is demonstrated as follows where in addition to the symbols defined in the foregoing:

$K_0$ is a constant
$C$ is a constant
$\theta_1$=the angular change in $e_0$ at the beginning of a half-cycle of rectification
$\theta_2$=the angular change in $e_0$ at the end of a half-cycle of rectification The capacity of the capacitor 15 is assumed to be so large that $\theta_1=\theta_2$ which is to say that the change in $e_0$ during a cycle is small enough to be neglected.

$e_1$=the instantaneous value of positive voltage across the detector element.
$i_1$=the instantaneous current through the detector element
$i_0$=the D. C. current through the non-linear load element
$i_a$=the average value of $i$
$i_0=i_a$
$i_0=K_0e_0^\delta$
$i_1=K_1e_1^\delta$ $$e_1=\Big[E\sin\theta-e_0\Big]_{\theta_1}^{\pi-\theta_2}$$

but since $\theta_1=\theta_2$ and $$e_0=E\sin\theta_1$$

and therefore, $$e_1=\Big[E\sin\theta-E\sin\theta_1\Big]_{\theta_1}^{\pi-\theta_1}$$

$$i_a=\frac{1}{2\pi}\int_{\theta_1}^{\pi-\theta_1}i_1d\theta=\frac{K_1}{2\pi}\int_{\theta_1}^{\pi-\theta_1}e_1^\alpha d\theta=\frac{K_1E}{2\pi}\int_{1}^{\pi-\theta_1}(\sin\theta-\sin\theta_1)^\alpha d\theta$$

If $\sin\theta_1$ is a constant, the value of the integral will be a constant. Sin $\theta_1$ will be a constant if $e_0$ is proportional to E. Assume $\sin\theta_1$ is a constant and determine whether or not $e_0$ is proportional to E.

Assuming sin $\theta_1$ to be a constant, then $$i_a=\frac{K_1E^\alpha}{2\pi}C$$

but since $i_a=i_0$ $$\therefore K_0e_0^\alpha=i_0=\frac{CK_1E^\alpha}{2\pi}$$

$$\therefore e_0=\left[\frac{CK_1}{2\pi K_0}\right]^{1/\alpha}E$$

and $e_0$ is proportional to E. Therefore, the value of the integral is a constant and the solution above is correct.

I claim as my invention:

1. A linear detector circuit comprising an input circuit having resistance, a pair of similar rectifier elements connected in series so as to conduct in the same direction and connected across said input circuit, an output circuit having a first resistor connected across one of said elements, and a second resistor having substantially the same resistance as said first resistor connected across the other of said elements and the resistance of said input circuit.

2. A linear detector circuit comprising an input circuit having a resistance, a first resistor having substantially the same resistance as that of said input circuit, a pair of similar rectifier elements connected in series with each other so as to conduct in the same direction, said pair of rectifier elements being connected in series with said resistor across said input circuit, an output circuit having a resistance and being connected across one of said elements and said first resistor, and a second resistor having substantially the same resistance as said output circuit and being connected across the other of said elements and the resistance of said input circuit.

3. A linear detector circuit as claimed in claim 1 in which a capacitor is connected across said one of said elements.

4. A linear detector circuit as claimed in claim 2 in which a capacitor is connected across said one of said elements and the first mentioned resistor.

References Cited in the file of this patent

UNITED STATES PATENTS

| Number | Name | Date |
|---|---|---|
| 2,312,070 | Bliss | Feb. 23, 1943 |
| 2,425,923 | Crosby | Aug. 19, 1947 |
| 2,452,551 | Conant | Nov. 2, 1948 |
| 2,587,555 | Weiss | Feb. 26, 1952 |

FOREIGN PATENTS

| Number | Country | Date |
|---|---|---|
| 836,199 | France | Oct. 10, 1938 |
| 878,802 | France | Oct. 26, 1942 |